United States Patent
Lee

(10) Patent No.: US 10,442,477 B2
(45) Date of Patent: Oct. 15, 2019

(54) VARIABLE CORNER VANE ASSEMBLY FOR VEHICLE

(71) Applicants: HYUNDAI MOTOR COMPANY, Seoul (KR); KIA MOTORS CORPORATION, Seoul (KR)

(72) Inventor: Myung-Kyu Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 15/835,183

(22) Filed: Dec. 7, 2017

(65) Prior Publication Data

US 2019/0061838 A1 Feb. 28, 2019

(30) Foreign Application Priority Data

Aug. 28, 2017 (KR) .......................... 10-2017-0108579

(51) Int. Cl.
*B62D 35/00* (2006.01)

(52) U.S. Cl.
CPC ......... *B62D 35/001* (2013.01); *B62D 35/005* (2013.01)

(58) Field of Classification Search
CPC ............................ B62D 35/005; B62D 35/001

USPC ....................................................... 296/180.1
See application file for complete search history.

(56) References Cited

U.S. PATENT DOCUMENTS 9,085,324 B2 * 7/2015 Kojima ................. B62D 25/04

FOREIGN PATENT DOCUMENTS

DE   102017000819 A1 * 7/2017 ........... B62D 35/001
KR   10-2004-0089861 A    10/2004

* cited by examiner

*Primary Examiner* — Joseph D. Pape
*Assistant Examiner* — Dana D Ivey
(74) *Attorney, Agent, or Firm* — Morgan, Lewis & Bockius LLP

(57) ABSTRACT

A variable corner vane assembly for a vehicle is disclosed. The variable corner vane assembly includes a cover coupled to a corner panel installed between a front panel and a door of the vehicle, a lift device for covering the cover and moving away from the cover in an outward direction of the vehicle as a function of lift generated by air flow when the vehicle moves, and a plurality of vanes extending from an inner surface of the lift device toward an inside of the vehicle and passing through the cover, the plurality of vanes controlling a flow of air drawn into a space between the lift device and the cover when the lift device moves away from the cover.

19 Claims, 23 Drawing Sheets

VARIABLE CORNER VANE ASSEMBLY FOR VEHICLE

CROSS-REFERENCE TO RELATED APPLICATIONS

This application claims the benefit of priority to Korean Patent Application No. 10-2017-0108579, filed on Aug. 28, 2017 with the Korean Intellectual Property office, the disclosure of which is incorporated herein by reference in its entirety.

TECHNICAL FIELD

Exemplary embodiments of the present disclosure relate to a corner vane assembly which is installed on a corner of a vehicle so as to control the flow of air moving from a front surface of the vehicle to a side surface thereof; and, particularly, to a variable corner vane assembly for a vehicle which is retracted into the vehicle when the vehicle moves at a low speed, and which is extracted, or extended, out from the vehicle when the vehicle moves at a high speed, thus controlling the flow of air moving from the front surface of the vehicle to the side surface.

BACKGROUND

In general, some vehicles are provided with a corner vane configured to control a flow of air moving from a front surface of a vehicle to a side surface thereof.

In FIG. 1, there is illustrated a vehicle having no corner vane. In detail, a corner panel 3 is installed between a front panel 2 and a door 4 of a vehicle 1. The corner panel 3 is not provided with a separate structure such as a corner vane for controlling the flow of air moving from a front surface of the vehicle 1 to a side surface thereof when the vehicle 1 moves. As such, if there is no structure for controlling the flow of air moving from the front surface of the vehicle to the side surface, a door of the vehicle may be easily contaminated when the vehicle moves. Unlike passenger cars, commercial vehicles such as trucks are mainly used in sites having a large degree of foreign material such as dust. If the flow of air moving from the front surface of the vehicle to the side surface cannot be controlled, such as in the described scenario, the door 4 of the vehicle and even a door glass may be contaminated.

To solve the above problem, as shown in FIGS. 2 and 3, an example in which a fixed corner vane 100 is provided on a corner panel 3 of the vehicle 1 was proposed. In this example, the corner panel 3 is provided with the corner vane 100 having a guide configured to control the flow of air moving from the front panel 2 to the door 4, so that contamination of the side surface of the vehicle 1 can be reduced by controlling the flow of air.

However, as such, if the fixed corner vane 100 is installed on the corner panel, the corner panel 3 protrudes to allow the corner vane 100 to be installed thereon, thus detracting from the aesthetic appearance of the vehicle.

In addition, even when the vehicle moves at a low speed at which the degree of contamination on the side surface of the vehicle is relatively low, air flows through the corner vane 100. Hence, there is a problem in that noise and vibrations may be caused by the flow of air through the corner vane 100.

SUMMARY OF THE DISCLOSURE

An embodiment of the present disclosure is directed to a variable corner vane assembly for a vehicle which is retracted into the vehicle when the vehicle moves at a low speed, and which is extracted out of the vehicle when the vehicle moves at a high speed, thus controlling the flow of air moving from the front surface of the vehicle to the side surface.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a variable corner vane assembly for a vehicle, including: a cover coupled to a corner panel installed between a front panel and a door of the vehicle; a lift device configured to cover the cover and move away from the cover in an outward direction of the vehicle by lift formed by driving wind when the vehicle moves; and a plurality of vanes extending from an inner surface of the lift device toward an inside of the vehicle and passing through the cover, the plurality of vanes being configured to control a flow of air drawn into space between the lift device and the cover when the lift device moves away from the cover.

In an embodiment, when the vehicle moves at a predetermined speed or more, the lift device may move away from the cover.

The lift device may include: an outer panel disposed outside the vehicle and configured such that a peripheral edge thereof comes into contact with an inner peripheral edge of an opening of the corner panel when the lift device comes into contact with the cover; and an inner panel disposed on the outer panel toward the inside of the vehicle, and including, with respect to a direction in which air flows between the lift device and the cover, a front end and an outer end that make contact with the outer panel. A length of the outer panel may be greater than a length of the inner panel such that a distance that air flows along the outer panel is longer than a distance that air flows along the inner panel.

Space formed between the outer panel and the inner panel may be formed such that a width of a portion through which air is drawn into the space between the lift device and the cover is greater than a width of a portion through which air is discharged from the space between the lift device and the cover.

A cross-section of the lift device may have a shape complying with NACA6409 of National Advisory Committee for Aeronautics of the U.S.

A distance by which the lift device moves away from the cover may be increased as a speed of the vehicle increases.

The vanes may be disposed at positions spaced apart from each other in a vertical direction of the vehicle.

Vane sliding slots each having a shape corresponding to a cross-section of the corresponding vane may be formed in the cover so that the vanes pass through the cover through the vane sliding slots.

A mounting bracket having opposite ends bent from an intermediate portion thereof in an identical direction may be coupled to an inner surface of the cover.

The mounting bracket may include a plurality of mounting brackets coupled to the cover and arranged in a vertical direction.

The variable corner vane assembly may further include: a guide pin coupled at respective opposite ends thereof to the mounting bracket and the cover and configured to pass through one side of the corresponding vane between the mounting bracket and the cover; and an elastic member provided between the cover and the vane and configured to elastically support the vane and the lift device toward the inside of the vehicle.

A flange may be formed on an end of each of the vanes that is opposite to the lift device. The flange may extend in a direction perpendicular to the vane.

The guide pin may pass through the flange, and the elastic member may be installed between the flange and the cover.

Each of the vanes may have a shape that is upwardly curved from a front end thereof and downwardly curved from an intermediate portion thereof to a rear end, and the rear end of the vane may be disposed at a position lower than the front end thereof.

The variable corner vane assembly may further include a flap provided on each of the vanes and configured such that, when the vane is extracted outward from the vehicle, the flap interlocks with the vane and extends rearward from a rear end of the vane.

The flap may be installed on a lower surface of the vane.

A guide groove extending in a longitudinal direction of the vane may be formed in the lower surface of the vane at a position adjacent to the rear end of the vane. A first protrusion may be formed on an upper surface of the flap and inserted into the guide groove. The variable corner vane assembly may further include a flap deployment bracket configured to guide deployment of the flap such that the flap is extracted rearward from the rear end of the vane when the vane is extracted outward from the vehicle in a sideway direction of the vane.

The flap deployment bracket may be bonded to a mounting bracket coupled to an inner surface of the cover, the mounting bracket having opposite ends bent from an intermediate portion thereof in an identical direction.

A guide slot may be formed in the flap deployment bracket and curved to be convex in a direction toward an intermediate portion between a front portion and a side portion of the vane. A second protrusion may be formed on a lower surface of the flap and inserted into the guide slot.

The guide slot may be curved such that an intermediate portion thereof is disposed outside an arc of a circle.

DETAILED DESCRIPTION

Figure 1:
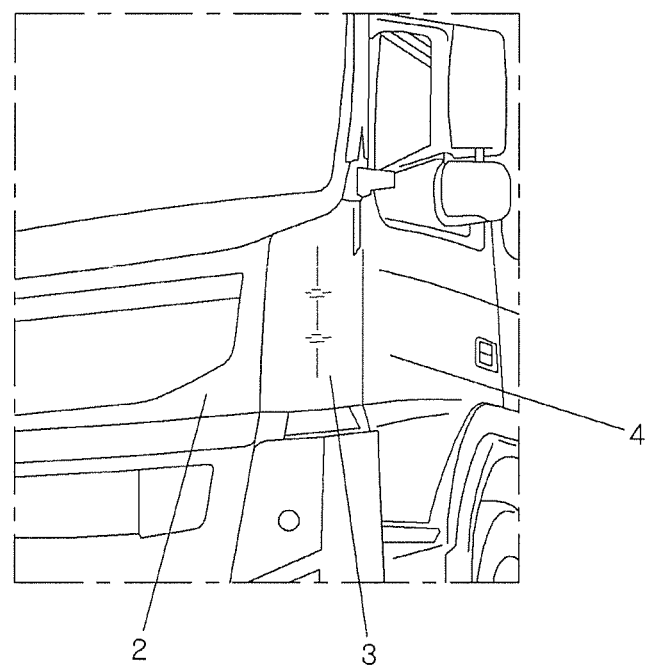
FIG. 1 is a perspective view illustrating a vehicle having no corner vane according to the prior art.
Figure 2:
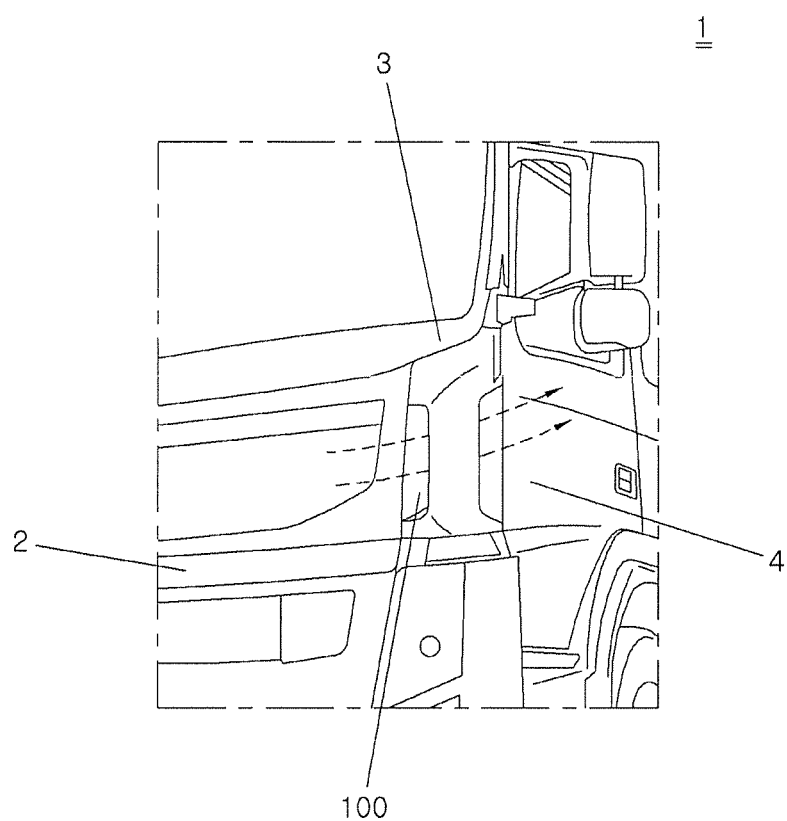
FIGS. 2 and 3 are respectively a perspective view and a front view illustrating a vehicle with a fixed corner vane according to the prior art.
Figure 3:
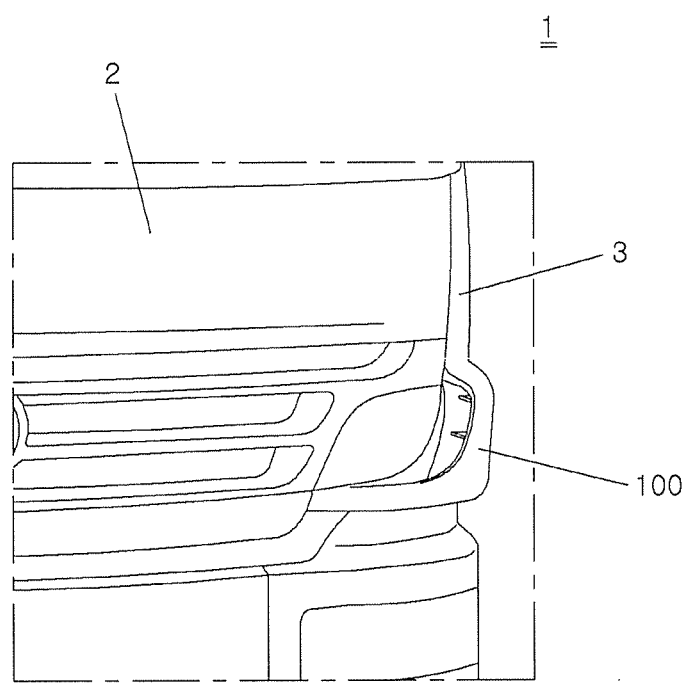
Figure 4:
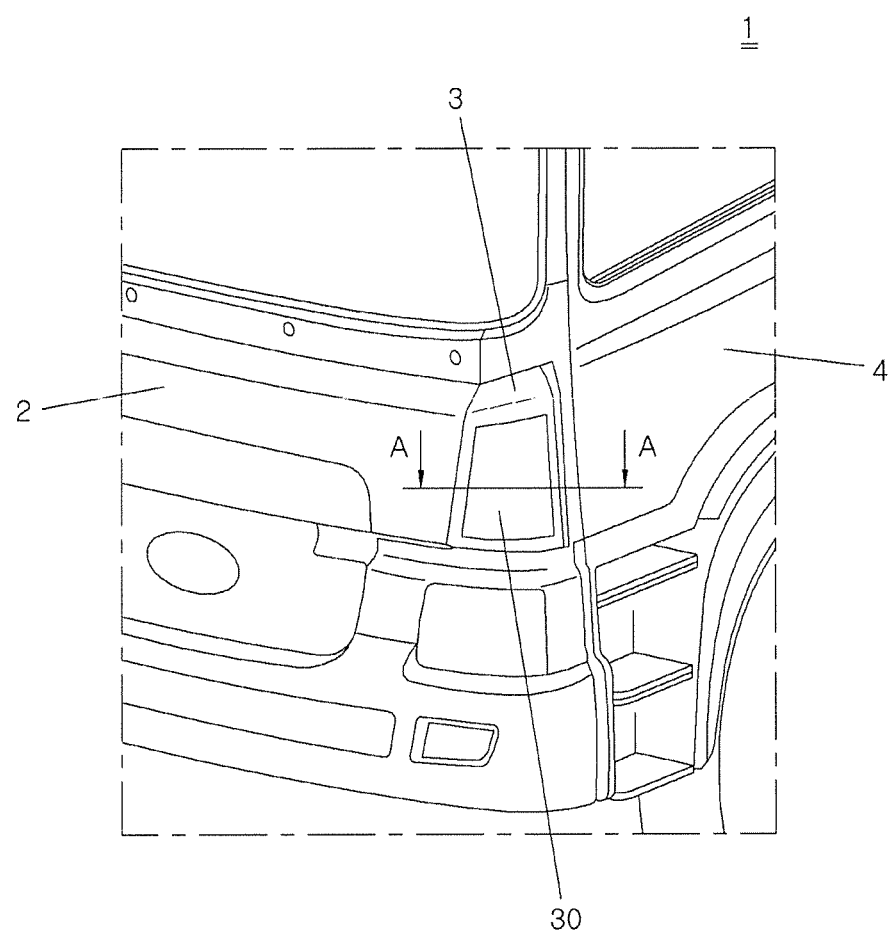
FIG. 4 is a perspective view illustrating a vehicle with a variable corner vane assembly according to exemplary embodiments of the present disclosure.
Figure 5:
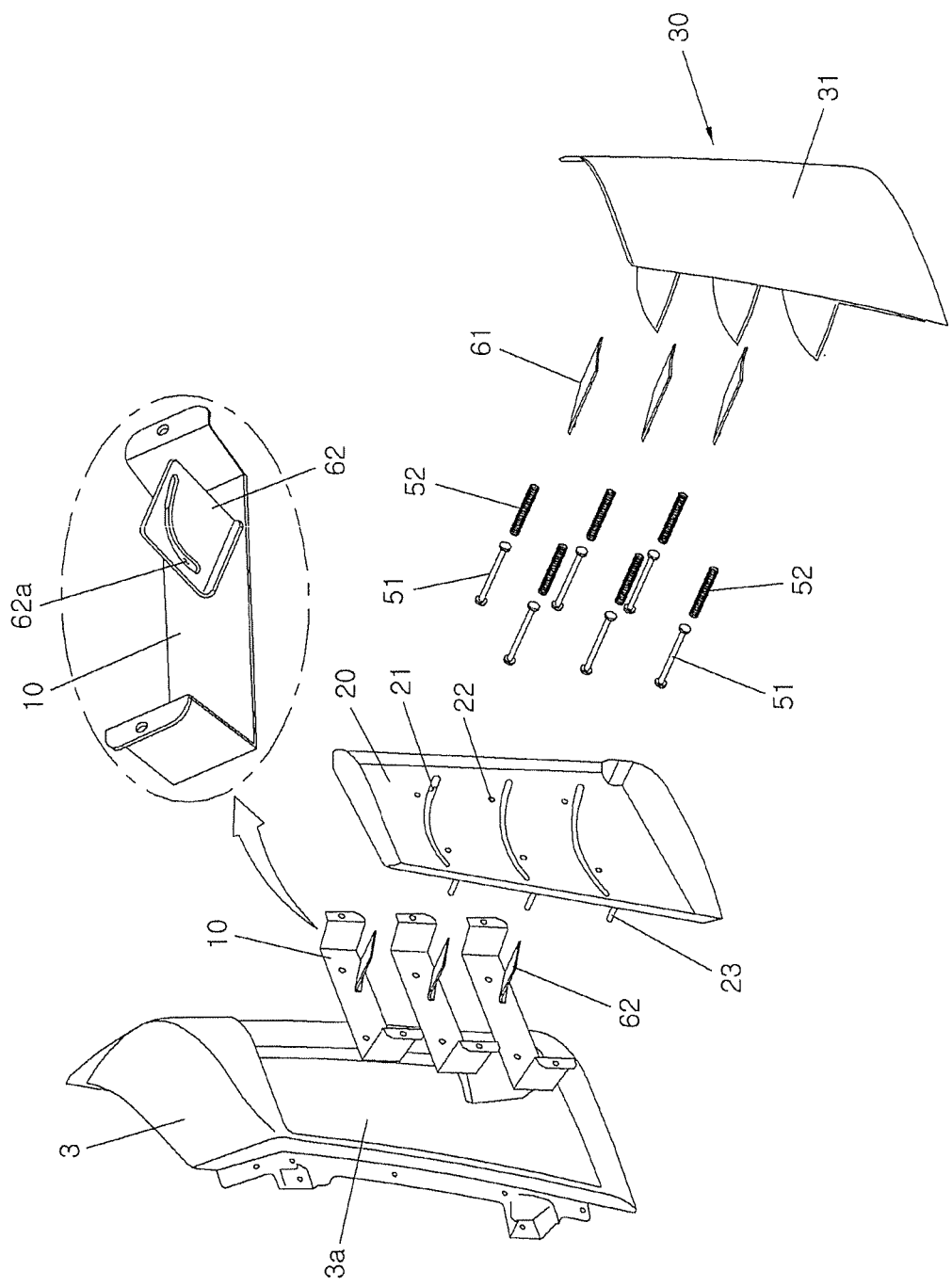
FIG. 5 is an exploded perspective view illustrating a variable corner vane assembly according to exemplary embodiments of the present disclosure.
Figure 6:
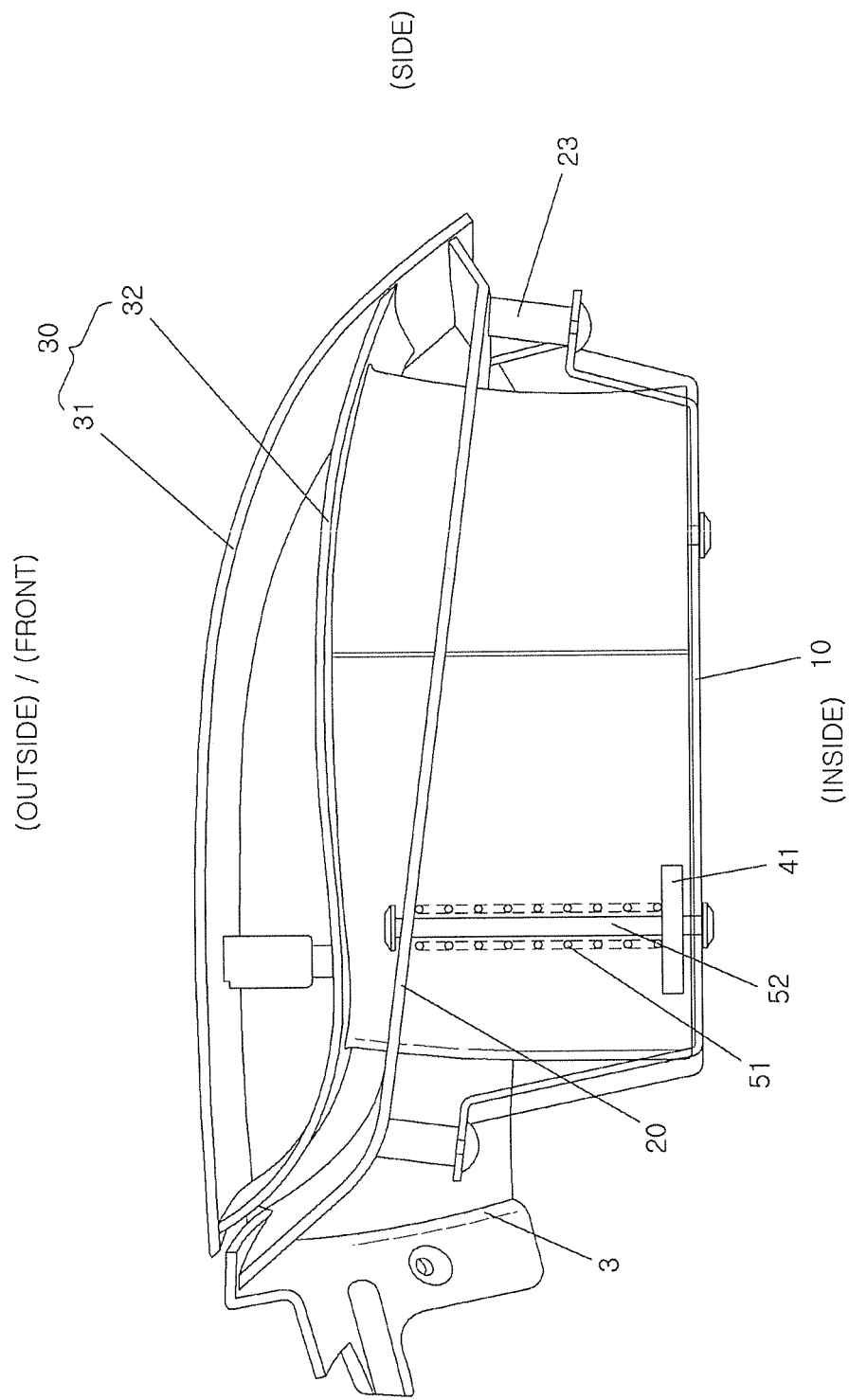
FIG. 6 is a sectional view taken along line A-A of FIG. 4.

Hereinafter, a variable corner vane assembly for a vehicle according to the present disclosure will be described in detail with reference to the accompanying drawings.

The variable corner vane assembly for a vehicle according to an exemplary embodiment of the present disclosure includes a cover 20, a lift device 30, and a plurality of vanes 40. The cover 20 is coupled to an opening 3a formed in a corner panel 3 installed between a front panel 2 and a door 4 of a vehicle 1. The lift device 30 covers an outer portion of the cover 20 and is configured to move away from the cover 20 in an outward direction of the vehicle by the lift formed by driving wind when the vehicle 1 moves. The vanes 40 are formed to extend from an inner surface of the lift device 30 in an inward direction of the vehicle 1 and pass through the cover 20. When the lift device 30 moves away from the cover 20, the vanes 40 controls the flow of air drawn into space between the lift device 30 and the cover 20.

The variable corner vane assembly according to the present disclosure is installed on the corner panel 3 provided between the front panel 2 and the door of the vehicle 1 and may be extracted outward by the lift generated by driving wind flowing along the outer surface of the corner panel 3 depending on the speed of the vehicle 1.

The cover 20 is coupled to the corner panel 3. The peripheral portion of the cover 20 may be coupled to the corner panel 3 along the perimeter of the opening 3a.

The lift device 30 is installed in the cover 20 so as to be slidable so that the lift device 30 can be extracted from or retracted into the cover 20.

The cover 20 has vane sliding slots 21 and passing holes 22 through which the vanes 40 of the lift device 30 and guide pins 51 respectively slide. The vane sliding slots 21 and the passing holes 22, respectively, have shapes corresponding to cross-sections of the vanes 40 and the guide pins 51. Here, the vane sliding slots 21 and the passing holes 22 are respectively slightly larger than the vanes 40 and the guide pins 51 so that the vanes 40 and the guide pins 51 can smoothly move.

Coupling protrusions 23 may be provided on the perimeter of the cover 20 so that, when the cover 20 is coupled to the corner panel 3, the coupling protrusions 23 are inserted into respective through-holes formed in the corner panel 3 to guide the coupling of the cover 20 to the corner panel 3.

A mounting bracket 10 is coupled at opposite ends thereof, or to the cover 20, to respective opposite sides of the cover 20. The mounting bracket 10 is formed in a shape in which the opposite ends thereof are bent from an intermediate portion thereof. The mounting bracket 10 is bent such that the opposite ends thereof are oriented in the same direction. The opposite ends of the mounting bracket 10 are coupled to a surface of the cover 20 that faces the inside of the vehicle.

In an embodiment, a plurality of mounting brackets 10 are provided and spaced apart from each other in the vertical direction by a predetermined distance.

The lift device 30 is provided outside the cover 20. The lift device 30 is configured so as to be slidable relative to the cover 20.

The lift device 30 is formed of an outer panel 31 and an inner panel 32 that are bonded to each other. The outer panel 31 and the inner panel 32 are bonded to each other at opposite ends of the lift device 30, and the other portion of the lift device 30 is hollow. In other words, the inner panel 32 is bonded to the outer panel 31 at front and rear ends thereof with respect to a direction in which air flows between the lift device 30 and the cover 20, and an intermediate portion of the inner and outer panels 32 and 31 is hollow.

Particularly, the lift device 30 is configured such that, when the vehicle 1 moves, the lift is formed outward with respect to the vehicle 1. To this end, the lift device 30 is formed such that the length of the outer panel 32 is greater than that of the inner panel 32. Because the length of the outer panel 31 is greater than that of the inner panel 32, the speed of air flowing along the outer panel 31 when the vehicle 1 moves is higher than that of air flowing along the inner panel 32. Thereby, the lift is formed outward with respect to the vehicle. Moreover, a structure disposed between the lift device 30 and the cover 20 acts as resistance against air flowing along the inner panel 32. Therefore, since the speed of air flowing along the outer panel 31 is higher than that of air flowing along the inner panel 32, the lift is generated outward with respect to the vehicle 1 when the vehicle 1 moves.

As such, when the vehicle 1 moves, the flow rates of air on opposite surfaces of the lift device 30, i.e., the outer panel 31 and the inner panel 32, differ from each other, whereby lift is generated on the lift device 30.

The lift generated in such a manner acts as a force by which the lift device 30 is extracted outward from the inside of the vehicle 1.

Here, the cross-sectional shape of the lift device 30 may comply with NACA6409 National Advisory Committee for Aeronautics of the U.S. According to NACA6409, the outer panel 31 has an outwardly curved shape, and the inner panel 32 has a shape in which a front portion thereof is inwardly curved and intermediate and rear portions thereof are outwardly curved.

The vanes 40 are perpendicularly formed on the inner surface of the lift device 30, i.e., on the inner panel 32. The vanes 40 guide the movement of the lift device 30 when the lift device 30 is extracted, or extended, from or retracted into the cover 20. The vanes 40 may be integrally formed with the lift device 30.

The plurality of vanes 40 may be provided and arranged in the vertical direction of the vehicle 1.

The vanes 40 control the flow of air that moves between the cover 20 and the lift device 30 after the lift device 30 has been extracted from the cover 20.

The cross-section of each vane 40 can have a shape in which it is upwardly curved from a front end thereof and downwardly curved from an intermediate portion thereof to a rear end, and the rear end thereof is disposed at a position lower than the front end. Hence, the vanes 40 control air drawn into space between the lift device 30 and the cover 20 so that the air flows downward, i.e., toward the ground.

Figure 7:
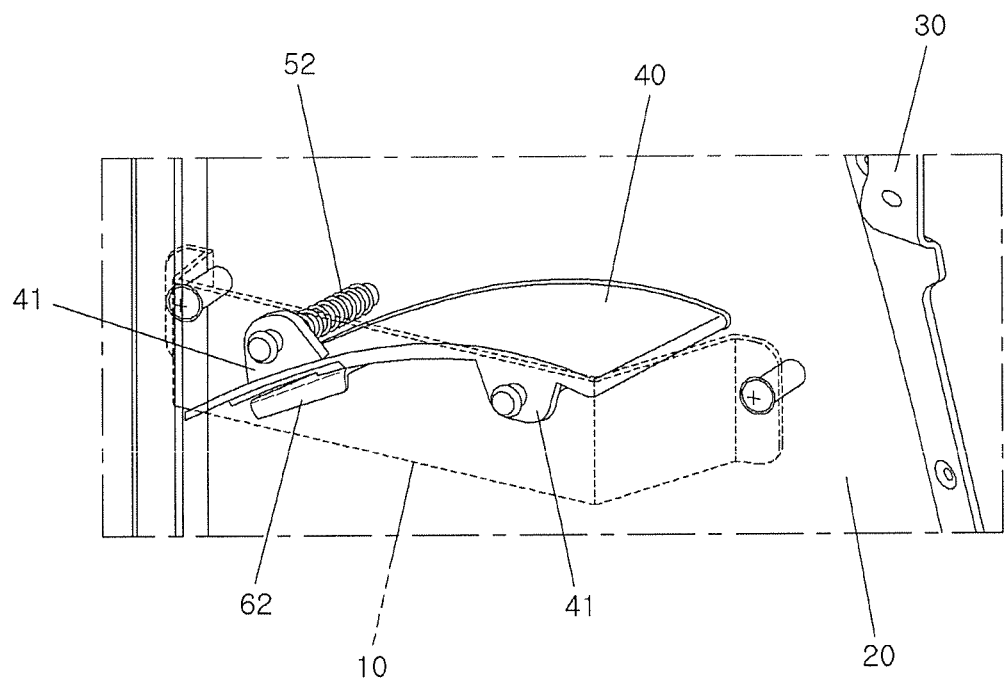
FIG. 7 is a perspective view illustrating an internal structure of a variable corner vane assembly according to exemplary embodiments of the present disclosure.

A flange 41 vertically extending from each vane 40 is provided on an end of the vane 40 that is opposite to the lift device 30 (refer to FIG. 7). The flange 41 is used to install the vane 40 on the corresponding guide pin 51, which will be described later herein. A plurality of flanges 41 may be provided at positions spaced apart from each other in a longitudinal direction of the vane 40. Some of the flanges 41 may be oriented upward with respect to the vane 40, and the other flanges 41 may be oriented downward with respect to the vane 40.

A guide groove 42 is formed in a lower surface of the vane 40 in the longitudinal direction of the vane 40. The guide groove 42 is used to guide sliding movements of a flap 61.

When the lift device 30 slides relative to the cover 20, the guide pin 51 guides the sliding of the lift device 30. One end of each guide pin 51 is fixed to the cover 20, and the other end thereof is fixed to the corresponding mounting bracket 10. Here, the guide pin 51 passes through the flange 41 of the vane 40.

Therefore, because the flange 41 slides along the mounting bracket 10 in a state in which the opposite ends of the guide pins 51 are fixed to the cover 20 and the mounting bracket 10, the sliding movement of the vane 40 is guided.

A plurality of guide pins 51 may be provided for each mounting bracket 10. An elastic member, e.g., a spring 52, is fitted over the guide pin 51. The spring 52 is provided in the form of a coil spring, and opposite ends thereof are respectively elastically supported on the cover 20 and the flange 41. Therefore, the spring 52 elastically supports, or biases, the flange 41 toward the inside of the vehicle 1, i.e., toward the mounting brackets 10, with respect to the cover 20. Thus, the spring 52 applies elastic force to the lift device 30 and the vanes 40 such that they move toward the mounting brackets 10, i.e., toward the inside of the vehicle 1.

Although all of the guide pins 51 may be provided with the springs 52, only some of the guide pins 51 may be provided with springs 52. Here, elastic force E generated by all of the installed springs 52 may be set to be the same as lift L by which the lift device 30 can be extracted.

The operation of the variable corner vane assembly according to embodiments of the present disclosure having the above-mentioned configuration will be described below.

Figure 8:
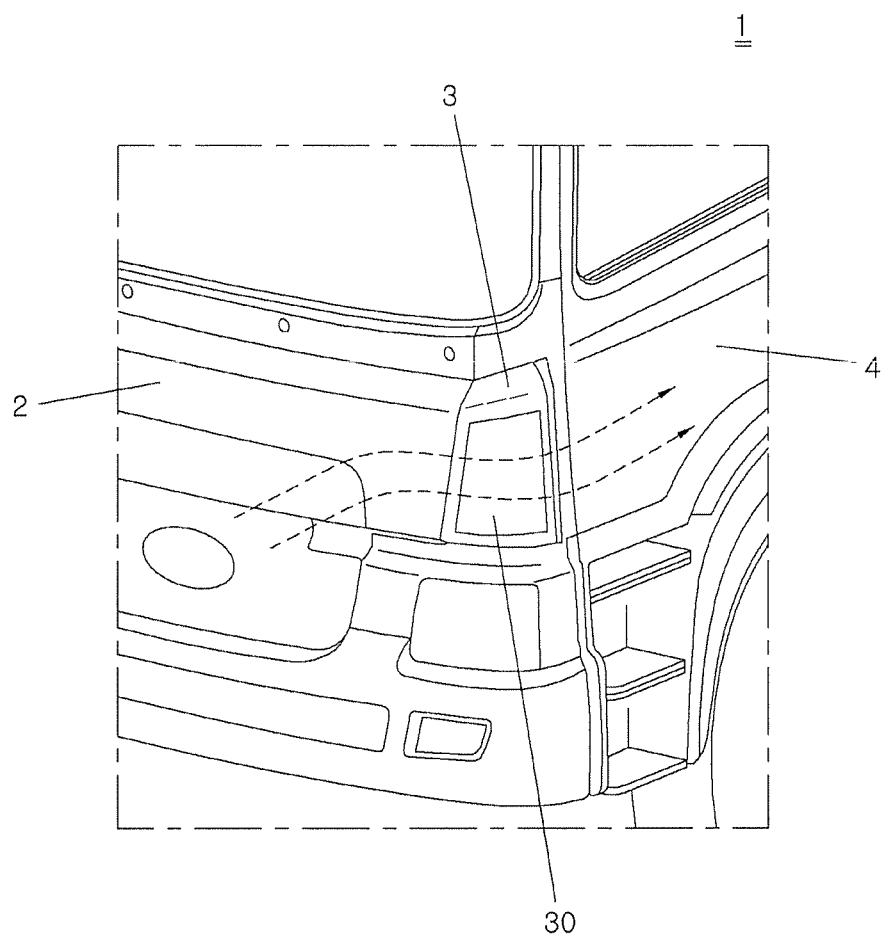
FIG. 8 is a perspective view illustrating the state of a variable corner vane assembly according to exemplary embodiments of the present disclosure when the vehicle moves at a low speed.
Figure 9:
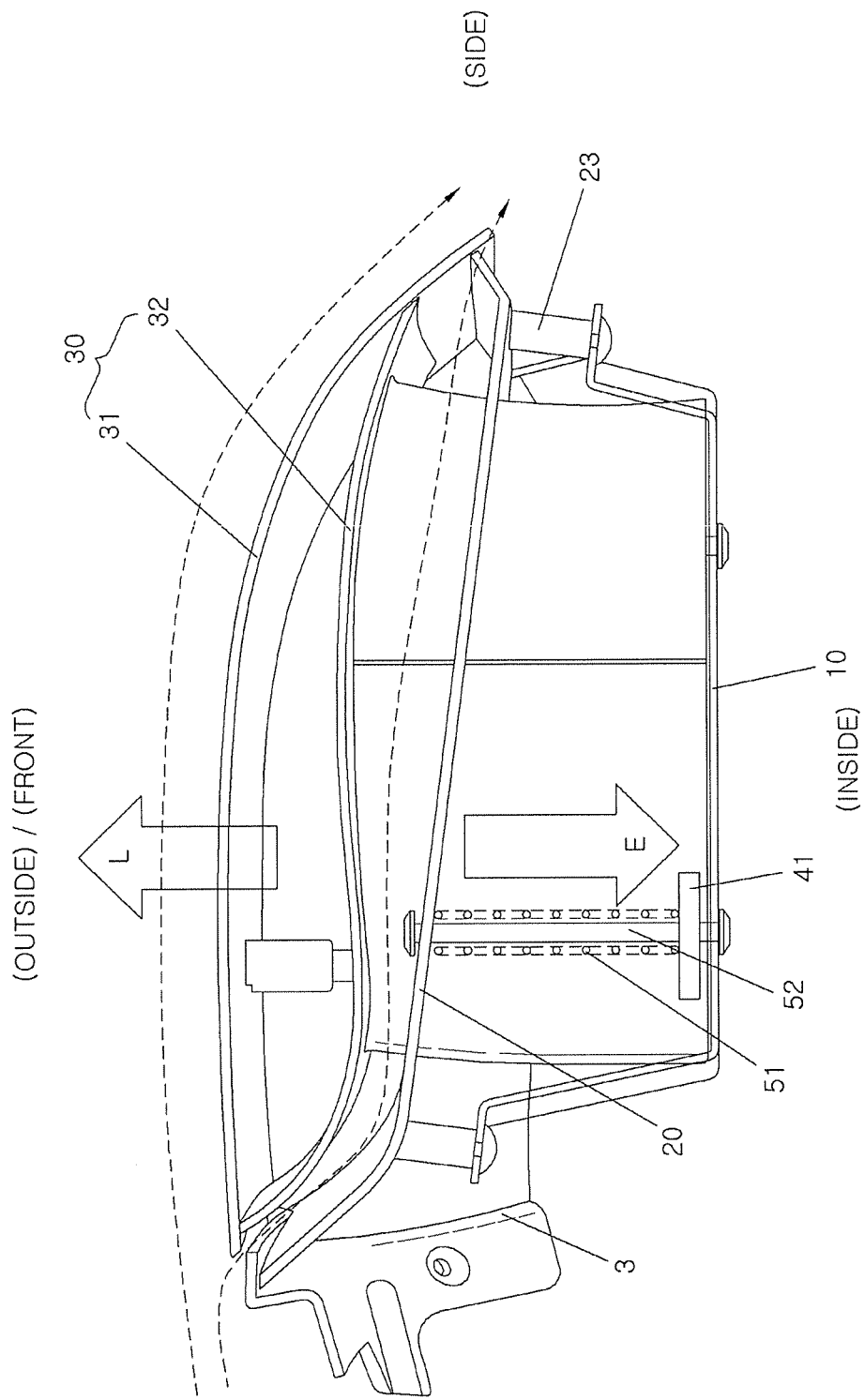
FIG. 9 is a sectional view illustrating a state of a variable corner vane assembly according to exemplary embodiments of the present disclosure when a vehicle moves at a low speed.

In FIGS. 8 and 9, there is illustrated the case where the vehicle 1 moves at a low speed. When the vehicle 1 moves, the lift L is generated on the lift device 30 by driving wind.

While the vehicle 1 moves, the driving wind passes from the front panel 2 toward the door 4 through the corner panel 3 and the lift device 30.

Here, the air flow formed around the lift device 30 is divided into air flow formed around the outer panel 31 and air flow formed around the inner panel 32 so that lift is generated in a direction from the inner panel 32 toward the outer panel 31, whereby the lift device 30 is biased outward from the vehicle 1.

The length of the outer panel 31 can be greater than that of the inner panel 32, and various structures between the inner panel 32 and the cover 20 can make the flow of air unsmooth. Consequently, the flow rate of air flowing along the outer surface of the outer panel 31 is comparatively high, so that the pressure around the outer panel 31 is low. The flow rate of air flowing along the inner panel 32 is comparatively low, so that the pressure around the inner panel 32 is high. Thus, the lift L is applied in a direction from the inner panel 32 toward the outer panel 31, whereby the outer panel 31 is biased outward relative to the vehicle 1.

However, the lift device 30 is integrally formed with the vanes 40 and the vanes 40 are elastically supported by the springs 52 toward the inside of the vehicle 1. Thus, simultaneously with the lift L, the elastic force E by the springs 52 is applied to the lift device 30. Here, the lift L and the elastic force E act in the directions opposite to each other.

When the vehicle 1 moves at a low speed, the lift L is not large so that the elastic force E applied to the lift device 30 is greater than the lift L applied thereto. Thus, the lift device 30 remains in close contact with the cover 20.

In other words, while the vehicle 1 moves at a low speed, the elastic force E of the spring 52 is greater than the lift L applied to the lift device 30 (E>L). Thus, the lift device 30 remains in close contact with the cover 20 without moving away from the cover 20.

As such, in the case where the vehicle 1 moves at a low speed, the lift device 30 remains in close contact with the corner panel 3 so that the vanes 40 configured to control the flow of air flowing from the front panel 2 of the vehicle 1 toward the door 4 are not exposed. Consequently, the aesthetic appearance of the vehicle can be enhanced. Furthermore, because there is no air flow through the vanes 40 when the vehicle 1 moves at a low speed, vibration or noise which may be caused by the flow of air passing through the vanes 40 can be reduced.

Figure 10:
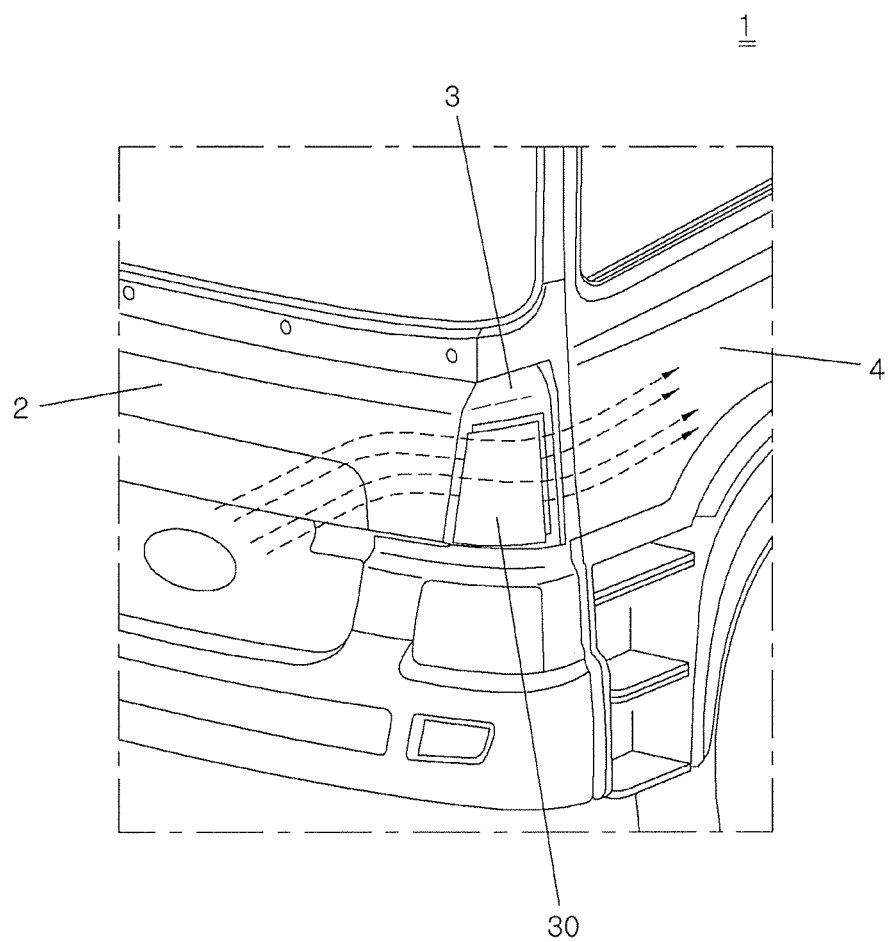
FIG. 10 is a perspective view illustrating a state of a variable corner vane assembly according to exemplary embodiments of the present disclosure when a vehicle moves at a high speed.
Figure 11:
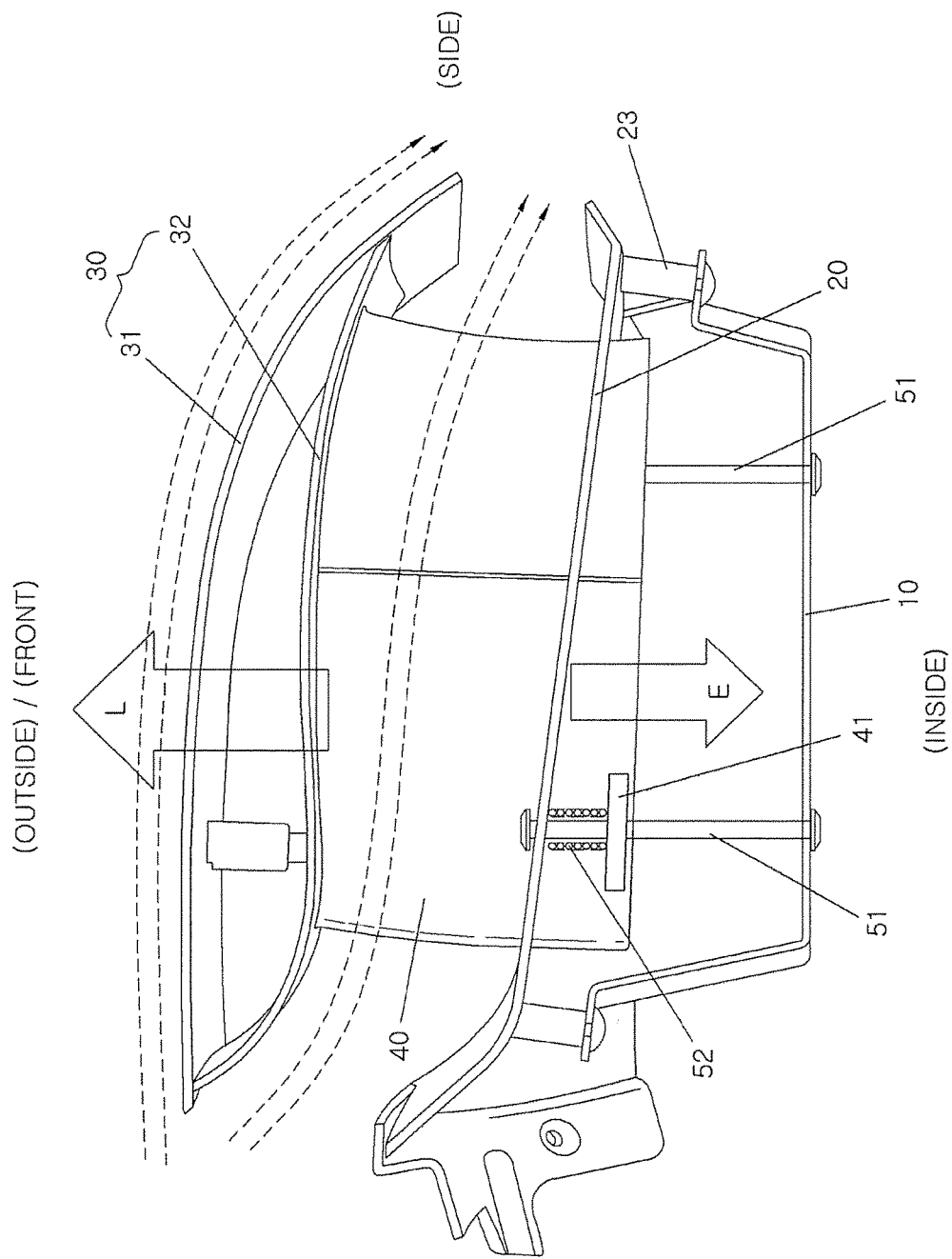
FIG. 11 is a sectional view illustrating a state of a variable corner vane assembly according to exemplary embodiments of the present disclosure when a vehicle moves at a high speed.

On the other hand, in FIGS. 10 and 11, there is illustrated the case where the vehicle 1 moves at a high speed. When the vehicle 1 moves at a high speed, the lift L is greater than the elastic force E (L>E), so that the lift device 30 moves away from the cover 20, and the vanes 40 are exposed between the lift device 30 and the cover 20. Thus, some driving wind passes through the vanes 40, whereby the flow of the driving wind is controlled.

When the speed of the vehicle 1 increases, both the lift L and the elastic force E are applied to the lift device 30 by the principle described above. Although the elastic force E does not change, the lift L increases as the speed of the vehicle 1 increases.

Therefore, if the lift L is greater than the elastic force E by the high-speed movement of the vehicle 1 (L>E), the lift device 30 begins to move away from the cover 20. Furthermore, when the lift device 30 moves away from the cover 20, the vanes 40 integrally formed with the lift device 30 are exposed.

If the vanes 40 are exposed between the lift device 30 and the cover 20, air flowing between the lift device 30 and the cover 20 is controlled by the vanes 40, whereby the door 4 or the side surface of the vehicle 1 can be prevented from being contaminated. In detail, the vanes 40 guide, toward the ground, air flowing between the lift device 30 and the cover 20, thus preventing the door 4 or the side surface of the vehicle 1 from being contaminated.

Moreover, as the speed of the vehicle 1 increases, the degree to which the lift device 30 protrudes outward from the vehicle 1 is increased. Since the lift L increases as the speed of the vehicle 1 is increased, the difference between the lift L and the elastic force E is increased, whereby the degree to which the lift device 30 protrudes is increased.

Figure 12A:
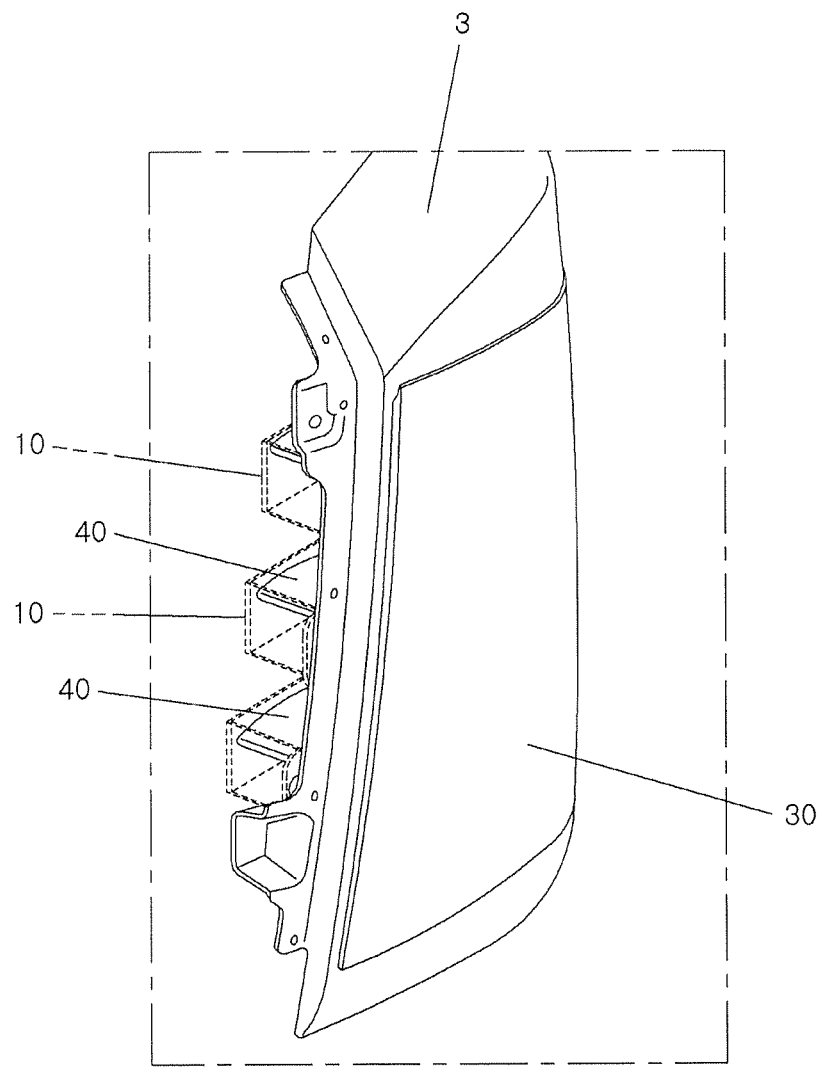
FIGS. 12A and 12B are perspective views respectively illustrating a retracted state and an extracted state of a lift device and a vane of a variable corner vane assembly according to exemplary embodiments of the present disclosure.
Figure 12B:
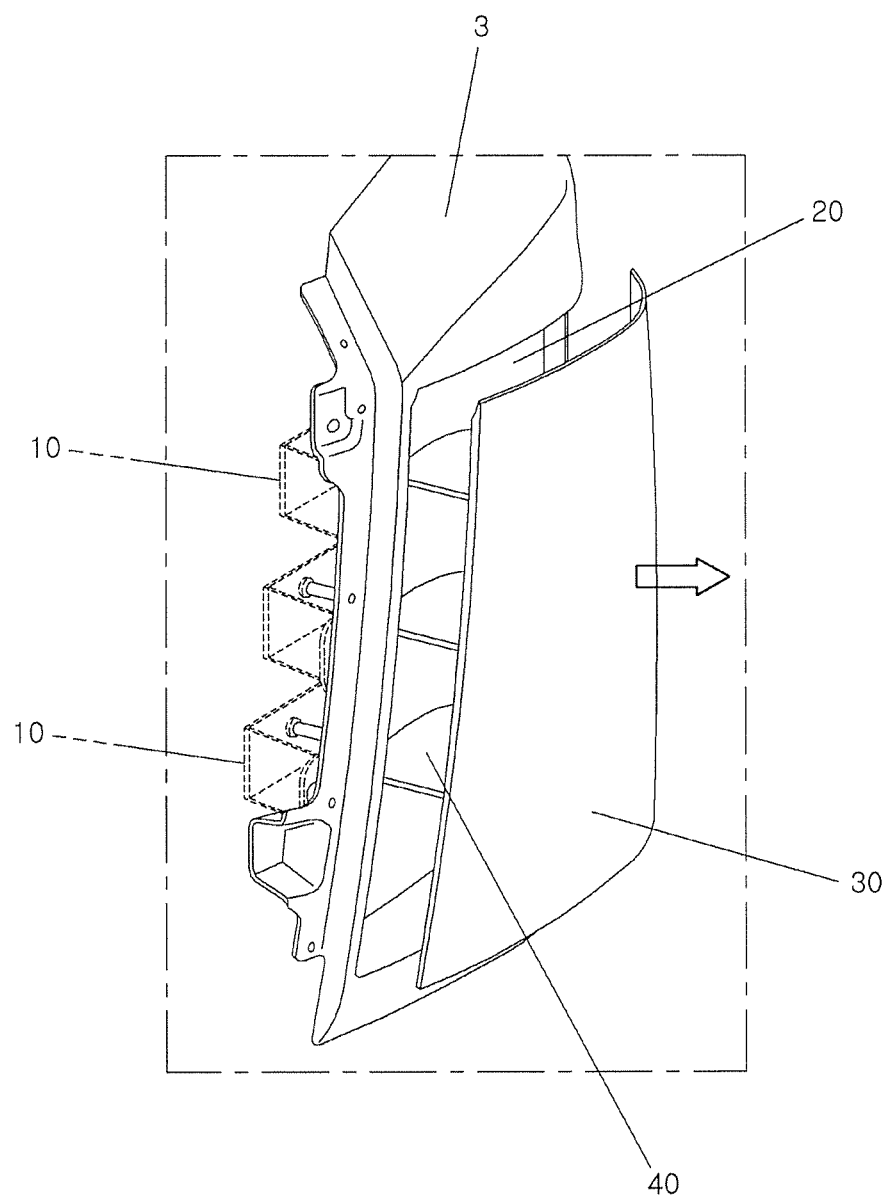

As described above, when the vehicle 1 stops or moves at a low speed, as shown in FIG. 12A, the lift device 30 comes into close contact with the cover 20, so that the lift device 30 along with the corner panel 3 forms the appearance of the vehicle. However, when the vehicle 1 moves at a speed higher than a predetermined speed, i.e., higher than a speed at which the lift L becomes greater than the elastic force E, as shown in FIG. 12B, the lift device 30 moves away from the cover 20 and the corner panel 3, and the flow of air is controlled by the vanes 40 exposed between the cover 20 and the lift device 30.

If the vehicle 1 stops or the speed of the vehicle 1 is reduced to a value lower than a speed at which the lift L is the same as that of the elastic force E, the elastic force E becomes greater than the lift L. Thereby, the lift device 30 is moved to its original position, i.e., in a direction toward the inside of the vehicle 1, so that it comes into contact with the cover 20, and the vanes 40 are moved into the cover 20 and retracted into the vehicle 1. Eventually, the lift device 30 is brought into contact with the corner panel 3.

The flap 61 is installed on each vane 40 to more efficiently control the flow of air passing through the vane 40. When the vane 40 protrudes between the lift device 30 and the cover 20, the flap 61 slides rearward relative to the vane 40 interlocking with the movement of the vane 40, thus providing the effect of increasing the length of the vane 40. Since the substantial length of the vane 40 is increased by the flap 61, air that has passed through the vane 40 can move farther.

Figure 16A:
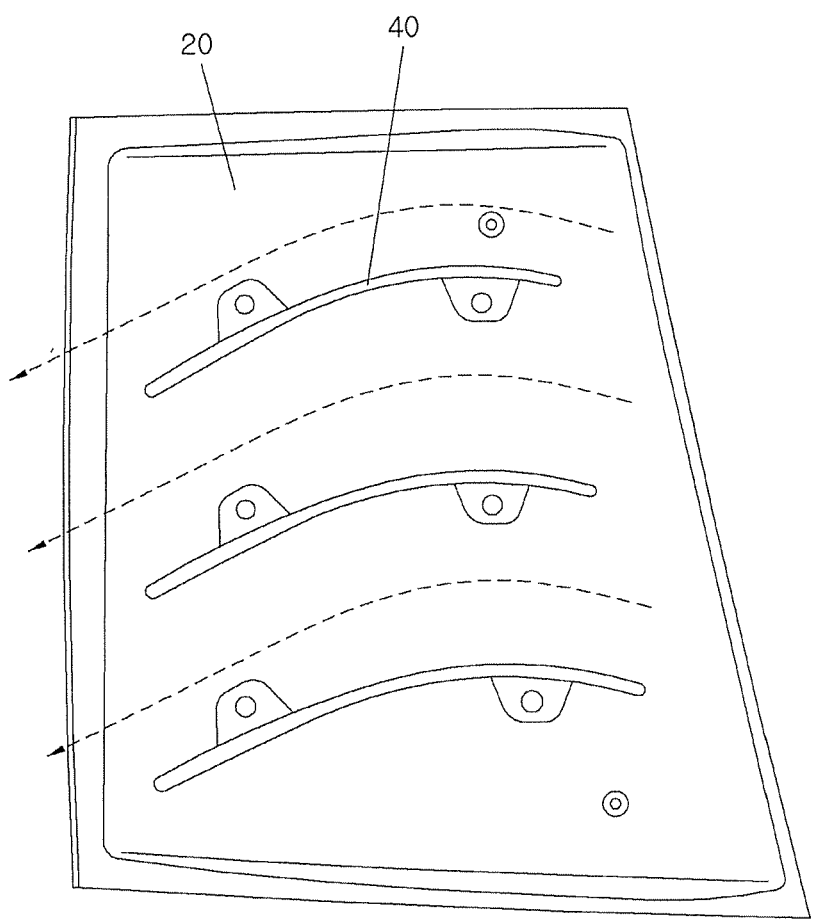
FIGS. 16A and 16B are side views for explaining a reason why a flap is installed in a variable corner vane assembly according to exemplary embodiments of the present disclosure.
Figure 16B:
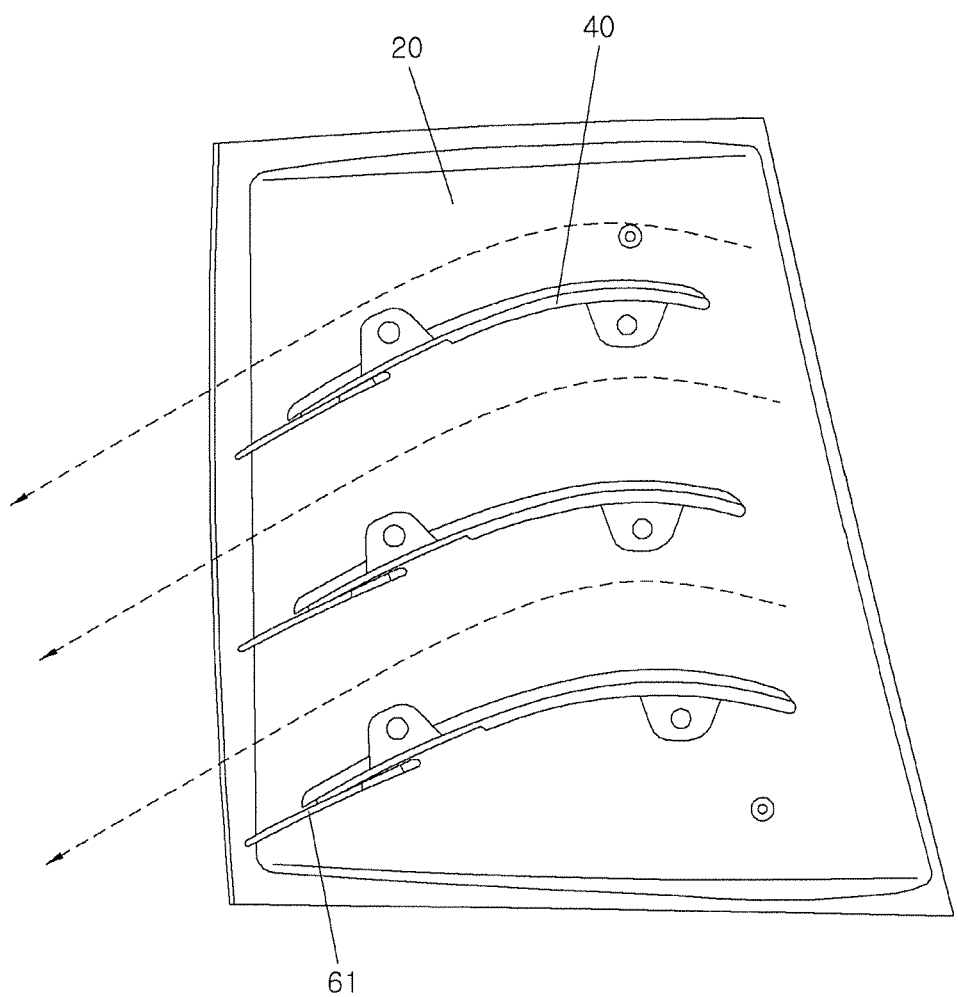

In detail, FIG. 16A illustrates the case where the flap 61 is not provided on the vane 40, and FIG. 16B illustrates the case where the flap 61 is provided on the vane 40. Since the flap 61 is installed on the vane 40 and operated interlocking with the vane 40, the valid length of the vane 40 is increased so that the flow of air passing through the vane 40 can be maintained farther.

As such, since the flow of air passing through the vane 40 can be maintained farther, air that has passed through the vane 40 can move farther toward the ground. Thereby, the performance of preventing the door 4 or the side surface of the vehicle from being contaminated can be further enhanced.

The installation configuration of the flap 61 will be described in more detail. The flap 61 is slidably installed on the vane 40. The flap 61 is installed so as to be slidable rearward from a rear end of the vane 40. The flap 61 may slide to extend rearward from a lower surface of the rear end of the vane 40.

Furthermore, when the vane 40 is extracted, the flap 61 should slide, interlocking with the extraction movement of the vane 40, rearward from the vane 40. Given this, the flap 61 is configured such that it is operated interlocking with the vane 40 for a predetermined time. To this end, a flap deployment bracket 62 configured to make the sliding movement of the flap 61 possible is provided on the mounting bracket 10.

The flap deployment bracket 62 is integrally coupled at one end thereof to an inner surface of the mounting bracket 10. Particularly, a guide slot 62a is formed in the flap deployment bracket 62 so as to control the sliding movement of the flap 61. The guide slot 62a can be formed in an arc, or arcuate, shape, or the like, in the flap deployment bracket 62. Depending on the shape of the guide slot 62a, i.e., the profile of the guide slot 62a, the deployment of the flap 61 is controlled. The flap deployment bracket 62 can be bonded to the mounting bracket 10 by a $CO_2$ arc welding method.

The flap 61 can be disposed between the vane 40 and the flap deployment bracket 62. A first protrusion 61a and a second protrusion 61b are respectively provided on upper and lower surfaces of the flap 61. The first protrusion 61a is inserted into the guide groove 42 formed in the lower surface of the vane 40. The second protrusion 61b is inserted into the guide slot 62a formed in the flap deployment bracket 62. Because the first protrusion 61a is inserted into the guide groove 42, the flap 61 is configured so as to be slidable forward or rearward relative to the vane 40.

Figure 13:
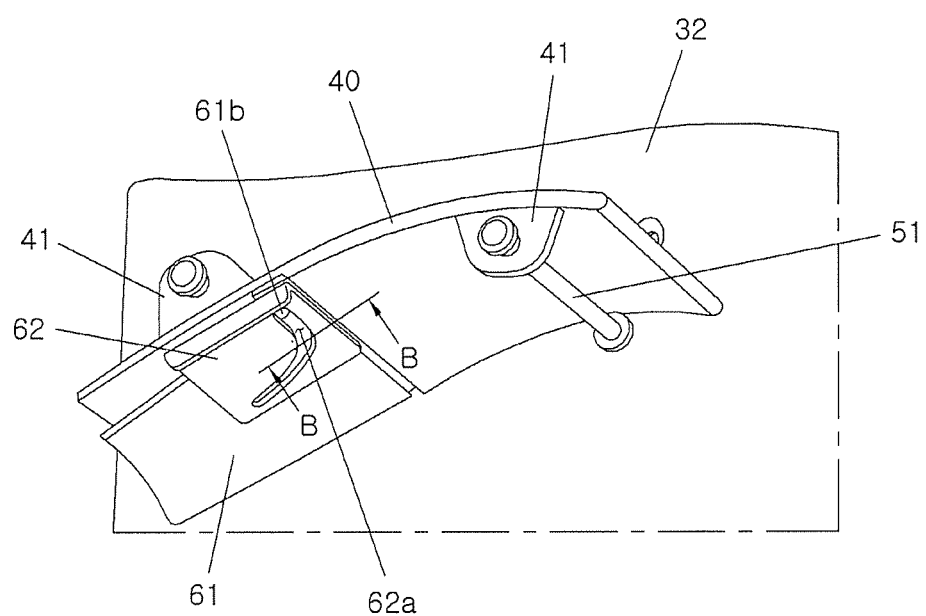
FIG. 13 is a perspective view illustrating a main portion of a variable corner vane assembly in which a flap is installed according to exemplary embodiments of the present disclosure.
Figure 14:
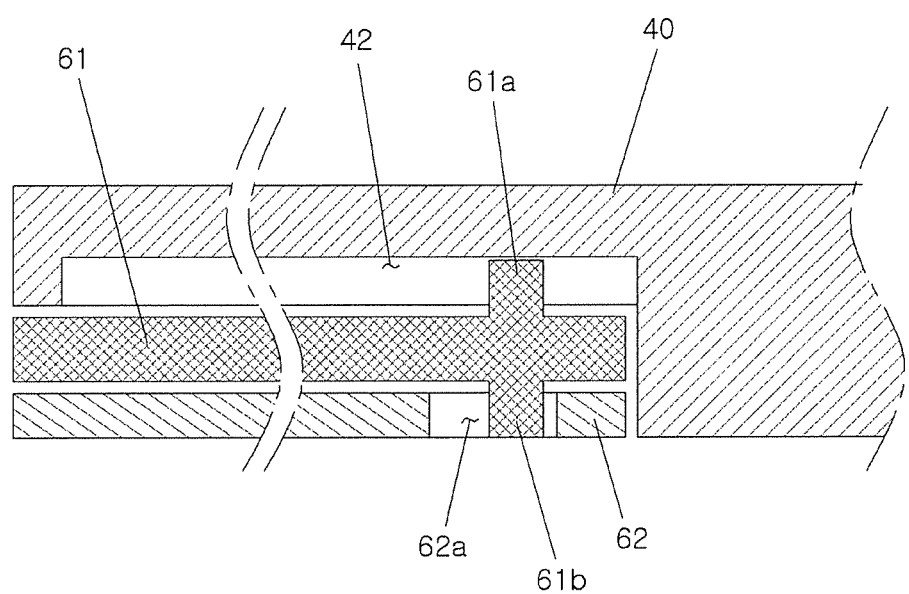
FIG. 14 is a sectional view taken along line B-B of FIG. 13.
Figure 15:
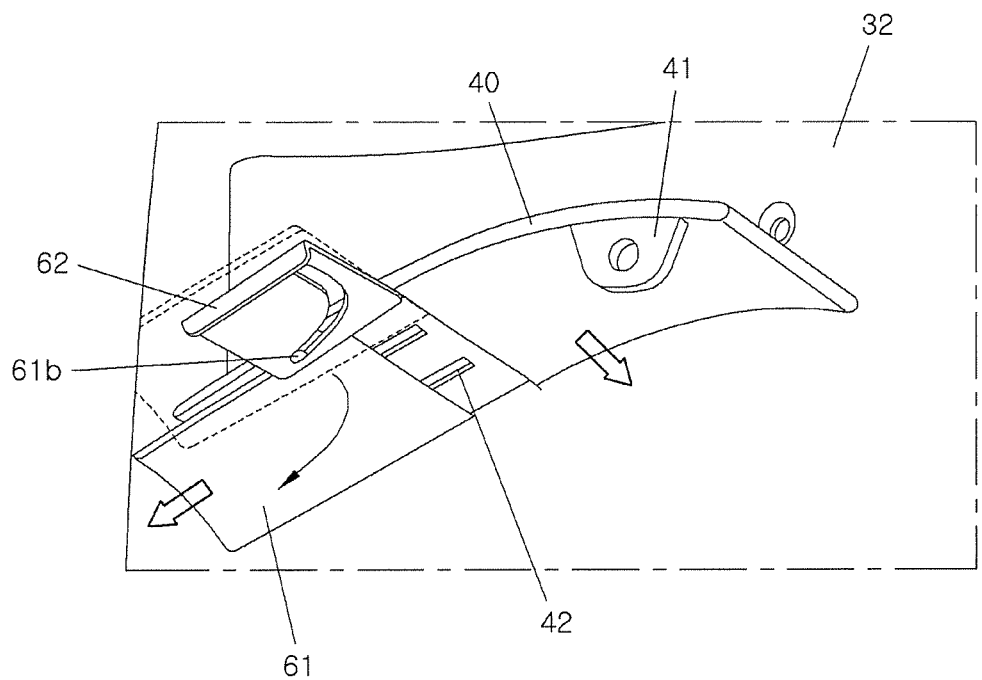
FIG. 15 is a perspective view illustrating a main portion of a variable corner vane assembly when a flap is deployed according to exemplary embodiments of the present disclosure.

The second protrusion 61b is inserted into the guide slot 62a of the flap deployment bracket 62. Therefore, when the flap 61 along with the vane 40 is extracted outward from the cover 20, the second protrusion 61b moves along the guide slot 62a and thus slides the flap 61. The guide slot 62a is curved to be convex in a direction toward an intermediate portion between a front portion and a side portion of the vane 40. Although the guide slot 62a may be formed in the form of an arc of a circle, it may be curved such that an intermediate portion thereof is more convex than the other portions thereof. Therefore, at an initial stage of the extraction movement of the vane 40, the degree to which the flap 61 moves rearward is relatively small, but at a last stage of the extraction movement of the vane 40, the flap 61 is rapidly moved rearward. As such, depending on the shape of the guide slot 62a, the timing and speed at which the flap 61 begins to be extracted from the vane 40 can be controlled. If the guide slot 62a is linear, the flap 61 may be moved rearward at a constant speed from the initial stage of the extraction movement of the vane 40 to the last stage thereof. If the guide slot 62a is formed in a direction opposite to the direction shown in FIG. 13, the flap 61 may be rapidly moved rearward at the initial stage of the extraction movement of the vane 40.

Figure 17A:
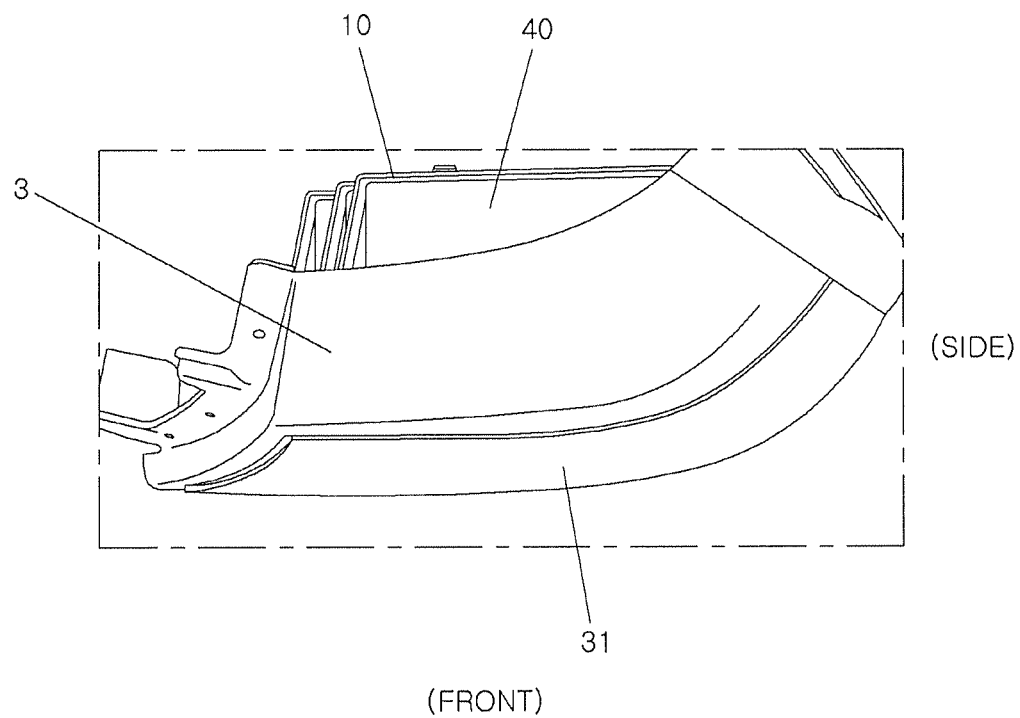
FIGS. 17A to 17C are plan views showing an extraction process of a lift device and a vane of a variable corner vane assembly according to exemplary embodiments of the present disclosure.
Figure 17B:
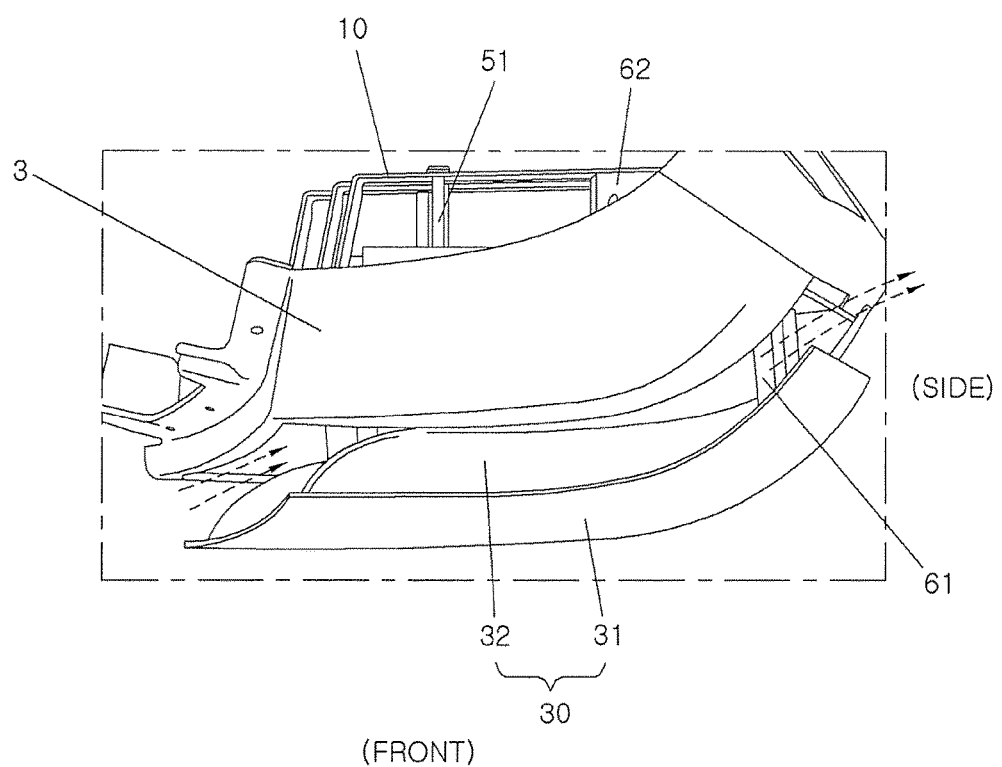
Figure 17C:
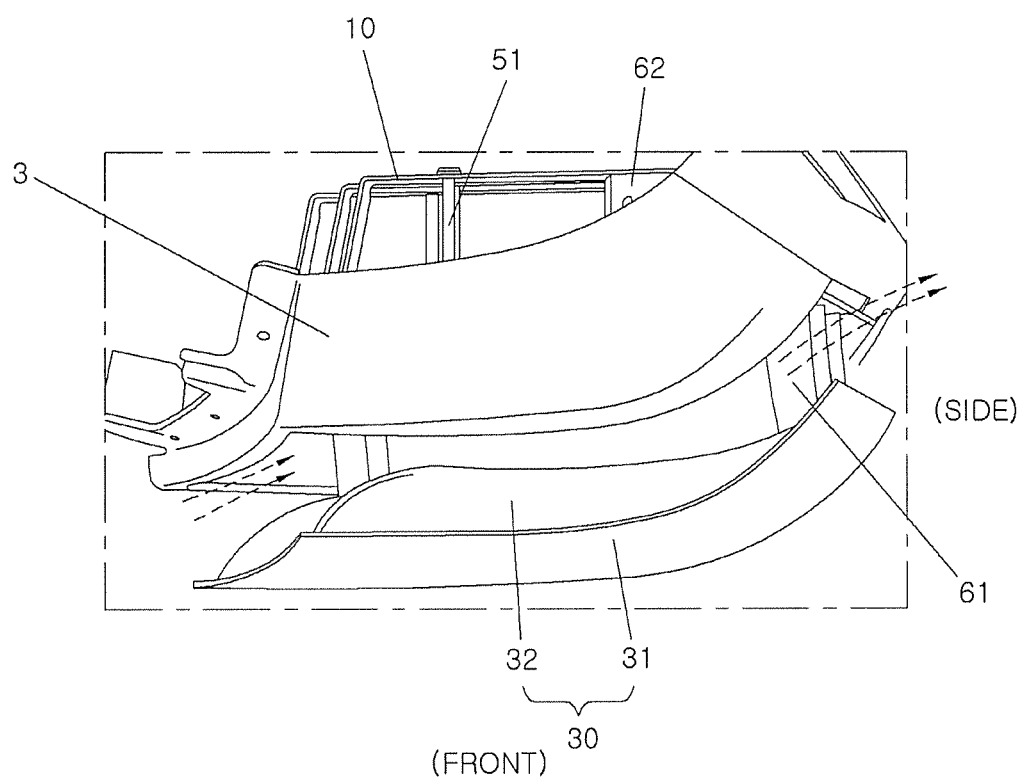

FIGS. 17A to 17C are plan views respectively illustrating a retracted state, an intermediate extracted state, and a completely extracted state of the lift device 30 that is extracted by the lift.

From the initial state of FIG. 17A, if the vehicle 1 moves at a speed higher than a predetermined speed (at which the lift becomes greater than the elastic force), the lift device 30 begins to be extracted outward from the vehicle (refer to FIG. 17B). If the lift device 30 begins to be extracted outward from the vehicle 1, the vanes 40 are exposed between the cover 20 and the lift device 30, and driving wind is drawn into the space between the cover 20 and the lift device 30. As the vanes 40 are extracted, the flaps 61 begin to be deployed from the vanes 40.

Thereafter, as shown in FIG. 17C, when the lift device 30 is completely extracted from the vehicle 1, the flaps 61 are completely deployed from the vanes 40. In this case, the flow of air drawn into the space between the lift device 30 and the cover 20 is controlled by the vanes 40 and the flaps 61. After having passed through the flaps 61, air is discharged toward the ground, whereby contamination of the door 4 or the side surface of the vehicle 1 can be minimized.

Figure 18A:
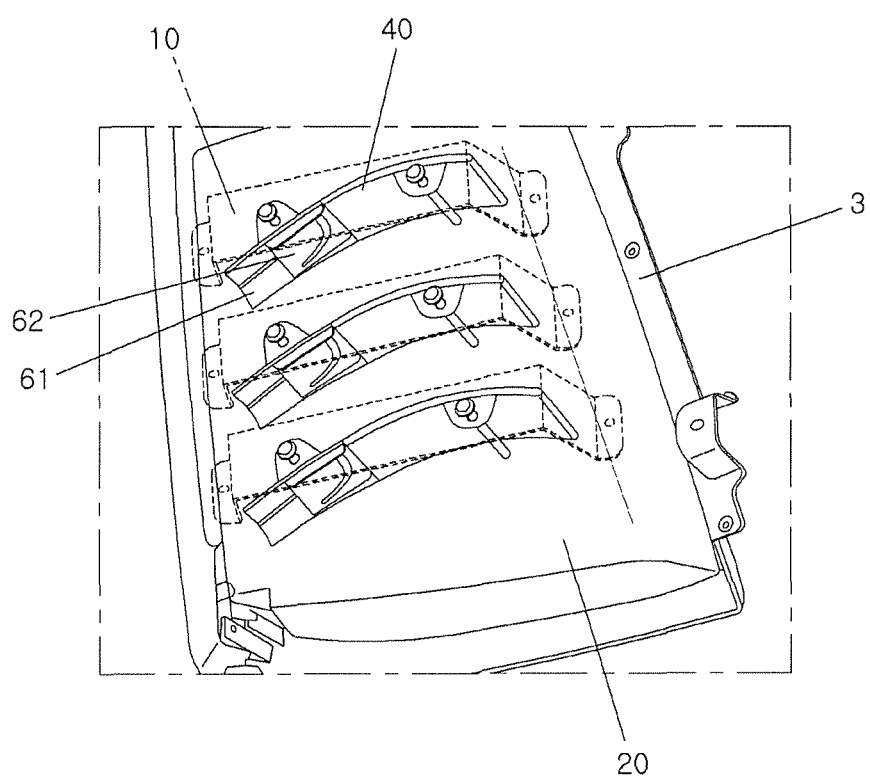
FIGS. 18A and 18B are perspective views illustrating a deployment process of a flap of a variable corner vane assembly when a vane is extracted according to exemplary embodiments of the present disclosure.
Figure 18B:
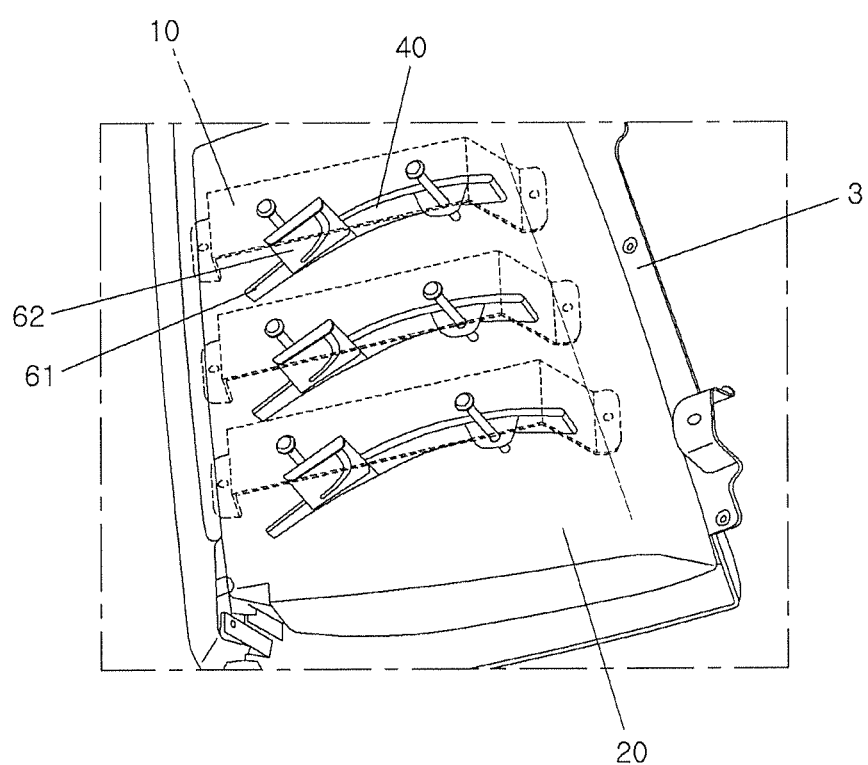

FIGS. 18A and 18B illustrate deployment of the flaps 61 while the vanes 40 are extracted from the vehicle 1.

FIG. 18a illustrates the retracted state of the vanes 40. When the vanes 40 along with the lift device 30 are extracted, the flaps 61 are deployed, interlocking with the extraction of the vanes 40, rearward from the vanes 40. Each flap 61 along with the corresponding vane 40 is moved in a sideway direction of the vane 40 and simultaneously deployed rearward from the vane 40 along the profile of the guide slot 62a of the flap deployment bracket 62.

As shown in FIG. 18b, when each vane 40 is completely extracted, the corresponding flap 61 is also completely deployed rearward. As such, if the vanes 40 are completely extracted, as described above, not only can the flow of air drawn into the space between the cover 20 and the lift device 30 be controlled by the vanes 40, but the flap 61 can also provide the effect of increasing the substantial length of each vane 40, whereby air can be reliably guided toward the ground.

As described above, a variable corner vane assembly for a vehicle according to exemplary embodiments of the present disclosure is retracted into the vehicle when the vehicle moves at a low speed. Therefore, design marketability of the vehicle can be enhanced because the corner vane does not protrude out of the vehicle.

Furthermore, when the vehicle moves at a low speed, all air that flows from a front surface of the vehicle to a side surface thereof moves along an outer surface of a lift device. Consequently, noise and vibrations which may be generated by the flow of air may be reduced.

Moreover, when the vehicle moves at a high speed, the lift device and a vane are exposed out of the vehicle so as to control the flow of air, thus reducing contamination of the vehicle due to air flowing from the front surface to the side surface when the vehicle moves.

While the present disclosure has been described with respect to the specific embodiments, it will be apparent to those skilled in the art that various changes and modifications may be made without departing from the spirit and scope of the disclosure as defined in the following claims.

What is claimed is:

1. A variable corner vane assembly for a vehicle, comprising:
   a cover coupled to a corner panel installed between a front panel and a door of the vehicle;
   a lift device for covering the cover and moving away from the cover in an outward direction of the vehicle as a function of lift generated by air flow when the vehicle moves; and
   a plurality of vanes extending from an inner surface of the lift device toward an inside of the vehicle and passing through the cover, the plurality of vanes controlling a flow of air drawn into a space between the lift device and the cover when the lift device moves away from the cover
   wherein the lift device comprises:
      an outer panel disposed outside the vehicle and configured such that a peripheral edge thereof comes into contact with an inner peripheral edge of an opening of the corner panel when the lift device comes into contact with the cover; and
      an inner panel disposed on the outer panel toward the inside of the vehicle, and including, with respect to a direction in which air flows between the lift device and the cover, a front end and an outer end that make contact with the outer panel, wherein a length of the outer panel is greater than a length of the inner panel such that a distance that air flows along the outer panel is longer than a distance that air flows along the inner panel.

2. The variable corner vane assembly of claim 1, wherein, when the vehicle moves at or greater than a predetermined speed, the lift device moves away from the cover.

3. The variable corner vane assembly of claim 2, wherein a distance by which the lift device moves away from the cover increases as a speed of the vehicle increases.

4. The variable corner vane assembly of claim 1, wherein space formed between the outer panel and the inner panel is formed such that a width of a portion through which air is drawn into the space between the lift device and the cover is greater than a width of a portion through which air is discharged from the space between the lift device and the cover.

5. The variable corner vane assembly of claim 1, wherein a cross-section of the lift device has a shape complying with NACA6409 of National Advisory Committee for Aeronautics of the United States.

6. The variable corner vane assembly of claim 1, wherein the vanes are disposed at positions spaced apart from each other in a vertical direction of the vehicle.

7. The variable corner vane assembly of claim 1, wherein vane sliding slots, each having a shape corresponding to a cross-section of the corresponding vane, are formed in the cover so that the vanes pass through the cover through the vane sliding slots.

8. The variable corner vane assembly of claim 1, wherein a mounting bracket having opposite ends bent from an intermediate portion thereof in an identical direction is coupled to an inner surface of the cover.

9. The variable corner vane assembly of claim 8, wherein the mounting bracket comprises a plurality of mounting brackets coupled to the cover and arranged in a vertical direction.

10. The variable corner vane assembly of claim 8, further comprising:
   a guide pin coupled at respective opposite ends thereof to the mounting bracket and the cover and configured to pass through one side of the corresponding vane between the mounting bracket and the cover; and
   an elastic member provided between the cover and the vane and configured to elastically support the vane and the lift device toward the inside of the vehicle.

11. The variable corner vane assembly of claim 10, wherein a flange is formed on an end of each of the vanes that is opposite to the lift device, the flange extending in a direction perpendicular to the vane.

12. The variable corner vane assembly of claim 11, wherein the guide pin passes through the flange, and the elastic member is installed between the flange and the cover.

13. The variable corner vane assembly of claim 1, wherein each of the vanes has a shape that is upwardly curved from a front end thereof and downwardly curved from an intermediate portion thereof to a rear end, and the rear end of the vane is disposed at a position lower than the front end thereof.

14. The variable corner vane assembly of claim 1, further comprising
   a flap provided on each of the vanes and configured such that, when the vane is extracted outward from the vehicle, the flap interlocks with the vane and extends rearward from a rear end of the vane.

15. The variable corner vane assembly of claim 14, wherein the flap is installed on a lower surface of the vane.

16. The variable corner vane assembly of claim 15,
   wherein a guide groove extending in a longitudinal direction of the vane is formed in the lower surface of the vane at a position adjacent to the rear end of the vane, and
   wherein a first protrusion is formed on an upper surface of the flap and inserted into the guide groove, and
   the variable corner vane assembly further comprises a flap deployment bracket configured to guide deployment of the flap such that the flap is extracted rearward from the rear end of the vane when the vane is extracted outward from the vehicle in a sideway direction of the vane.

17. The variable corner vane assembly of claim 16, wherein the flap deployment bracket is bonded to a mounting bracket coupled to an inner surface of the cover, the mounting bracket having opposite ends bent from an intermediate portion thereof in an identical direction.

18. The variable corner vane assembly of claim 17,
   wherein a guide slot is formed in the flap deployment bracket and curved to be convex in a direction toward an intermediate portion between a front portion and a side portion of the vane, and
   wherein a second protrusion is formed on a lower surface of the flap and inserted into the guide slot.

19. The variable corner vane assembly of claim 18, wherein the guide slot is curved such that an intermediate portion thereof is disposed outside an arc of a circle.

* * * * *